United States Patent
Miyazaki et al.

[11] Patent Number: 5,910,863
[45] Date of Patent: Jun. 8, 1999

[54] MAGNETIC HEAD SLIDER AND MAGNETIC DISK DEVICE USING THE SAME

[75] Inventors: Takeshi Miyazaki, Hitachi; Yasutaka Suzuki, Jyuou-machi; Hiroshi Tomishima, Kawamoto-machi, all of Japan

[73] Assignees: Hitachi, Ltd.; Hitachi Metals, Ltd., both of Tokyo, Japan

[21] Appl. No.: 08/739,927

[22] Filed: Oct. 30, 1996

Related U.S. Application Data

[63] Continuation of application No. 08/309,354, Sep. 20, 1994, abandoned.

[30]     Foreign Application Priority Data

Sep. 20, 1993   [JP]   Japan .................................... 5-255228

[51] Int. Cl.$^6$ ........................................................ G11B 5/60
[52] U.S. Cl. ........................................... 360/103; 360/127
[58] Field of Search ................................... 360/127, 103, 360/122, 110; 501/91, 105, 127, 134, 135

[56]           References Cited

U.S. PATENT DOCUMENTS

| | | |
|---|---|---|
| 4,217,151 | 8/1980 | Mizuno et al. ................. 148/31.55 |
| 4,430,440 | 2/1984 | Wada et al. ........................ 501/105 |
| 4,489,168 | 12/1984 | Wank et al. ....................... 501/134 |
| 4,670,805 | 6/1987 | Onitsuka et al. ................. 360/103 |

FOREIGN PATENT DOCUMENTS

| | | | |
|---|---|---|---|
| 4-16553 | 1/1992 | Japan | 360/103 |
| 4-85721 | 3/1992 | Japan | 360/103 |
| 5-2730 | 1/1993 | Japan | 360/103 |

Primary Examiner—Stuart S. Levy
Assistant Examiner—William J. Klimowicz
Attorney, Agent, or Firm—Antonelli, Terry, Stout & Kraus, LLP

[57]               ABSTRACT

A magnetic disk recording device having a continuous medium type magnetic disk and a magnetic head slider, wherein the magnetic head slider is formed of a sintered body essentially consisting of titanium oxide as the major component thereof and at least one selected from the group consisting of Y, Yb, Nb, Mg, Er, Fe, Cr, Zr and Al in an amount of from 2 atm % to 50 atm % with respect to the titanium oxide, whereby a higher recording density is realized while maintaining a higher reliability of the device over long time span.

8 Claims, 5 Drawing Sheets

10μm

10μm

10 μm

10 μm

MAGNETIC HEAD SLIDER AND MAGNETIC DISK DEVICE USING THE SAME

This application is a Continuation of application Ser. No. 08/309,354, filed Sep. 20, 1994, now abandoned.

BACKGROUND OF THE INVENTION

The present invention relates to a magnetic head slider and a magnetic disk device using the same, and more particularly, it relates to a magnetic head slider which is suitable for use in combination with a continuous medium type disk and a magnetic disk device using the same.

In the field of magnetic disk devices using a floating type magnetic head, it is required to record and reproduce data on and from a disk with a high density and at a high speed in response to recent requirements for increases in the amount of data processing. For this reason, the floating height of the magnetic head is increasingly reduced and it is expected in the future that magnetic reading and writing of data on a disk will be performed without a gap, while the magnetic head is sliding on the disk. Depending on these objectives, development of materials for both the magnetic disk and the magnetic slider which exhibit a small wear amount is highly demanded, and many materials for both the magnetic disk and the magnetic slider which exhibit a small wear amount already have been proposed.

For example, with a view toward reducing mechanical shaving off or abrasive wear during solid-solid contact between a magnetic head slider and magnetic disk, JP-A-1-258219(1989) proposes matching the hardness between a surface protective film of the magnetic disk and the magnetic head slider within ±10%, and from a view point of reducing the friction coefficient, JP-A-63-269384(1988) and JP-A-1-137483(1989) propose formation of several kinds of lubricants in solid and liquid form on the floating surface of the magnetic head slider and adhering methods thereof.

In addition to the above requirement of improving the slidability of the magnetic head slider, the magnetic head slider has to fulfill many required characteristics as a structural material. For example, in a composite type magnetic head, materials such as barium titanate ($BaTiO_3$) and calcium titanate ($CaTiO_3$), which show comparatively large thermal expansion coefficients, are among ceramics materials that are used because of the necessity for matching the thermal expansion coefficient with the magnetic head element. Many proposals for improving the sintering property of these sinter bodies have been proposed, such as in JP-B-52-30162(1977), JP-B-51-42606(1976), JP-B-51-15528 (1976), JP-A-2-88458 (1990), JP-A-2-80365(1990), JP-A-2-124762(1990).

Further, for the purpose of improving the slidability in the conventionally and generally used material $Al_2O_3$—TiC, an addition of $TiO_2$ into $Al_2O_3$ is suggested in JP-A-57-198578 (1982).

However, even with the above indicated conventional measures, it was still difficult to reduce the wear amount over a long time span.

With regard to the above proposal of matching the hardness of the surface protective film for the magnetic disk and the magnetic head slider, such a measure is effective for reducing shaving off abrasive wear; however, the wear is also caused by third bodies, such as by wear powders of the slider itself, produced during the initial wear stage, and therefore the wear can not necessarily be controlled by hardness matching alone. Further, for magnetic disks having a carbon protective film on the surface thereof, it is noted that the carbon protective film produces oxidized wear powders due to the heat of friction, and for this mere reason, it is impossible to propose low wear materials simply based on hardness matching.

With regard to the above proposal of forming a lubricant on the floating face of the magnetic head slider, the friction coefficient is indeed reduced by this technique; however, the process of forming the lubricant layer is added step, and further, it is sometimes difficult to maintain the lubricity for a long time span, so that there is a tendency to solve the problem of the friction coefficient on the basis of the property of the material itself.

Materials combined with such materials as barium titanate ($BaTiO_3$) and calcium titanate ($CaTiO_3$) developed for a composite type magnetic head slider are primarily considered from the view point of their thermal expansion coefficients.

The present invention also uses $TiO_2$ as its major component and includes somewhat similar compositions as the conventional ones; however, as a result of experiments on the sliding property of materials, it was found out that no improvement of the sliding property could be achieved with the addition of Ca and Ba. Further, although the slidability of the material is greatly affected by the amount of additives, the slidability can not be improved unless the amount of the $TiO_2$ component exceeds 50 atm %; therefore, if the $TiO_2$ component of less than 50 atm % is added to $Al_2O_3$, the advantages achieved by the present invention can not be obtained.

SUMMARY OF THE INVENTION

An object of the present invention is to realize a magnetic disk recording device which permits a high density recording and a high speed signal transmission by providing a magnetic slider material which greatly reduces the amount of wear on both the magnetic disk and the magnetic head slider in comparison with conventional materials, through combination of the slider with a continuous medium type magnetic disk, which is produced via methods such as spattering and plating.

A sinter body containing titanium oxide as the major component and at least one element selected from the group consisting of Y, Yb, Nb, Mg, Er, Fe, Cr, Zr and Al in an amount more than 2 atm % and less than 50 atm % with respect the titanium oxide is used for the magnetic head slider, which is combined with a continuous medium type magnetic disk produced via methods such as spattering and plating.

Further, a better slidability with the magnetic disk can sometimes be obtained, when the metal ions form composite oxides with the titanium oxide, depending on the kinds of metal ions added.

Still further, a better slidability with the magnetic disk can sometimes be obtained, when the metal ions locate in the titanium oxide crystal lattice in the form of interstitial solid solution or substitutive solid solution.

Moreover, a better slidability with the magnetic disk can be sometimes obtained, when a part of the metal ions added form composite oxides with the titanium oxide as well as the remainder metal ions located in the titanium oxide crystal lattice in the form of interstitial solid solution or substitutive solid solution.

The above sinter body is produced by mixing the powder of titanium oxide with at least one of oxides, nitrides, carbonates, nitrates and phosphates of Y, Yb, Nb, Mg, Er, Fe, Cr, Zr and Al and sintering the mixture.

A property required for the magnetic head base material other than the slidability is workability. For improving workability, oxides such as $Al_2O_3$ and $ZrO_2$, which do not react with titanium oxide at its sintering temperature so as not to form a composite oxide therewith, can be added. Further, for the same purpose, carbides, such as SiC, TiC, ZrC, NbC, VC, $B_4C$, HfC, TaC and WC, which do not react with titanium oxide at its sintering temperature, can be added. Similarly, borides such as $CaB_6$, $TaB_2$ and $ZrB_2$, which do not react with titanium oxide at its sintering temperature, can be added. However, these oxides, carbides and borides can act adversely with respect to the slidability, so that the amount of these additives has to be limited to less than 30 volume %.

Further, the sintering temperature of the sinter body is limited to less than 1400° C.

Still further, when a thin film having the composition components of the sinter body containing titanium oxide as its major component and at least one element selected from the group consisting of Y, Yb, Nb, Mg, Er, Fe, Cr, Zr and Al in an amount greater than 2 atm % and less than 50 atm % with respect to titanium oxide is formed on the floating face of the magnetic head slider via a process such as spattering, vacuum evaporation, solid phase diffusion and ion implantation, the slidability with the magnetic disk is also improved.

When a head slider, a head disk assembly and a hard disk drive are produced by making use of the above explained sinter body, highly reliable devices are obtained. Further, a computer system incorporating a hard disk drive using the above explained sinter body for the head slider shows a higher device reliability and is in full compliance with the requirements for increase in the future of the magnetic recording density.

It is noted that titanium oxide is not suitable for a coating type magnetic disk, which is prepared by kneading magnetic powder with a resin, adding fillers such as $Al_2O_3$ particles therein for maintaining a predetermined strength, coating the same on an aluminum base plate and then sintering the same, because of the significant wear of the magnetic disk. This is because the difference in hardness between the $Al_2O_3$ filler and the titanium oxide is large, so that the wear of the titanium oxide increases. However, the present inventors found out through experiments that when the titanium oxide is combined with a continuous medium type magnetic disk of which the magnetic layer is formed via a process such as spattering and plating, wear of the magnetic head slider and the magnetic disk is less in the order of one magnitude than other $Al_2O_3$ system and $ZrO_2$ system materials at a low circumferential sliding speed of about 5 m/s; and, further, the friction coefficient thereof is ⅓ of the conventional combination.

It is understood on the one hand that, since the hardness of titanium oxide is smaller than that of $Al_2O_3$ system and $ZrO_2$ system materials, the wear of the disk is limited; however, with ceramic sinter bodies of MgO and $Al_2O_3$—$TiO_2$ having a similar hardness, the result is different. Therefore, it is presumed that the reduced wear of titanium oxide is due to the inherent material characteristic thereof, such as the catalystic property of the $TiO_2$ ceramic surface.

Further, in the course of sliding experiments, the present inventors noted that, when the sliding experiments of the magnetic head slider of $TiO_2$ ceramic were performed at a condition of relatively high circumferential speed of 20 m/s, the wear of carbon constituting the disk protective layer and the $TiO_2$ sliding body became comparable or greater than that of $Al_2O_3$ system and $ZrO_2$ system materials. As a result of observation and analysis of the sliding portion for clarifying the causes of the above characteristic, it was found that the $TiO_2$ reacts with carbon at a high circumferential speed to cause adhesive wear. Namely, the sliding body reacts with the carbon protective layer on the surface of the magnetic disk to produce wear powder from the resultant reaction layer, so that both wear at the sliding body and wear at the magnetic disk are increased. When the wear amount increases at one of the sliding body and the magnetic disk, the cause therefor can not be assumed to be adhesive wear.

Further, it is noted through theoretical calculation that the power of friction energy generated during sliding at a circumferential speed of 20 ms is more than double that at a circumferential speed of 5 m/s so that when simplifying the matter, it is presumed that the temperature of the sliding face at the circumferential speed of 20 m/s is more than twice that at the circumferential speed of 5 m/s and the cause of the adhesive wear is frictional heat.

The present invention has resulted from many investigations of methods of preventing adhesive wear due to frictional heat. Namely, the simple substance $TiO_2$ undergoes chemical reaction with carbon due to frictional heat to cause adhesion. Accordingly, it is considered effective to add a component which forms a composite oxide with titanium oxide for suppressing the chemical reaction with carbon. As a result of experimental study on reactivity of many composite oxides of titanium oxide with carbon, it was found that composite oxides of Ti with Y, Yb, Nb, Mg, Er, Fe, Cr, Zr and Al are effective. The reactivity of the composite oxides is examined in such a manner that the composite oxides are heat treated in air while applying therethrough a predetermined load on carbon and variation of surface roughness of the sinter bodies are examined. For reactive composite oxides, crystal growth is caused which increases surface roughness.

Further, since the slidability at a low circumferential speed of thus produced composite oxides is insufficient as compared to the simple substance of $TiO_2$, it is preferable to reduce the amount of additives as much as possible; however, if the amount of additives is too small, the wear amount at a high circumferential speed increases. With regard to a major amount of the simple substance of $TiO_2$ it is desirable to be added in a range less than 98 atm % and more than 50 atm %.

There are three types of metal ions which can be added. By including first type, the slidability is improved when the metal ions form composite oxides with titanium oxide, the slidability is improved when a second type of the metal ions are included in the crystal lattice of titanium oxides in the form of a substitutive or interstitial type solid solution, and the slidability is improved with a third type when a part of the metal ions form composite oxides with titanium oxide and the remainder thereof are included in the crystal lattice of titanium oxides in the form of a substitutive type or interstitial type solid solution.

The most common method of producing a sinter body is performed by mixing at least one of oxides, nitrides, carbonates, nitrates and phosphates of metal elements with titanium oxide and then by sintering the mixture. However, the production method is not limited thereto. Namely, since it sufficient for the metal ions to exist in the crystal lattice of titanium oxide, for example, the titanium oxide sintered body and the metal are heat treated while being maintained in contact with each other so that solid diffusion may be caused; and further, through such a process as ion implantation, the metal ions may be introduced into the crystal lattice of titanium oxide.

On the other hand, in addition to good slidability, the magnetic head material functioning as a thin film magnetic head base plate member is required to have a good workability when working into a slider. More specifically, it is required that chipping be limited, which is generated at a grinding angle portion of the material to be worked during grinding work via a diamond grindstone, as well as warping of the base plate is to be limited, which is caused by heating during processing thereof. For avoiding these problems, it is necessary to increase Young's modulus and to refine the crystalline particle diameter. For these purposes, it is effective to add a material having a comparatively high Young's modulus which does not react with titanium oxide crystallines in the sinter body. Examples of such additives are oxides such as $Al_2O_3$ and $ZrO_2$, carbides such as SiC, TiC, ZrC, VC, $B_4C$, HfC, TaC and WC and borides such as $CaB_6$, $TaB_2$, $TiB_2$ and $ZrB_2$. Those additives are effective which do not react with titanium oxide at its sintering temperature so as not to form a composite oxide, and the amount of these additives is desirably to be maintained in a range below 30 volume %. If these additives are added in excess of 30 volume %, the slidability is adversely affected.

Further, it is desirably to set the sintering temperature of the sinter body below 1400° C. If the body is sintered more than 1400° C., grain growth of titanium oxide is induced; and, when $Al_2O_3$ or $ZrO_2$ is added, a composite oxide of these additives with titanium oxide is formed, which can cause inconveniences of reducing Young's modulus as well as reducing workability.

Further, since it is enough if the above explained composition components of the sinter body only exist on the floating face of the magnetic head slider performing the actual sliding, a thin film having the same composition components of the sinter body can be formed on the floating face of the magnetic head slider via such processes as spattering, vacuum evaporation, solid phase diffusion and ion implantation, if cost increase for the magnetic head production processes is disregarded. With a head slider, head disk assembly and head disk drive which are produced by making use of such a sinter body, and with a computer system incorporating a hard disk drive using these sinter bodies as the head slider, highly reliable devices are realized.

BRIEF DESCRIPTION OF THE DRAWINGS

FIG. 3(a) and FIG. 3(b) are scanning electron microscope (SEM) photographs illustrating crystalline structure change at the surface of $TiO_2$ before and after heat treatment thereof, wherein FIG. 3(a) illustrates the surface condition before the heat treatment and FIG. 3(b) illustrates the surface condition after the heat treatment;

FIGS. 4(a) and 4(b) are SEM photographs illustrating crystalline structure change at the surface of $TiO_2$—5 atm % $Nb_2O_5$ before and after heat treatment thereof, wherein FIG. 4(a) illustrates the surface condition before the heat treatment and FIG. 4(b) illustrates the surface condition after the heat treatment;

DETAILED DESCRIPTION OF EMBODIMENTS

Embodiment 1

Figure 1:
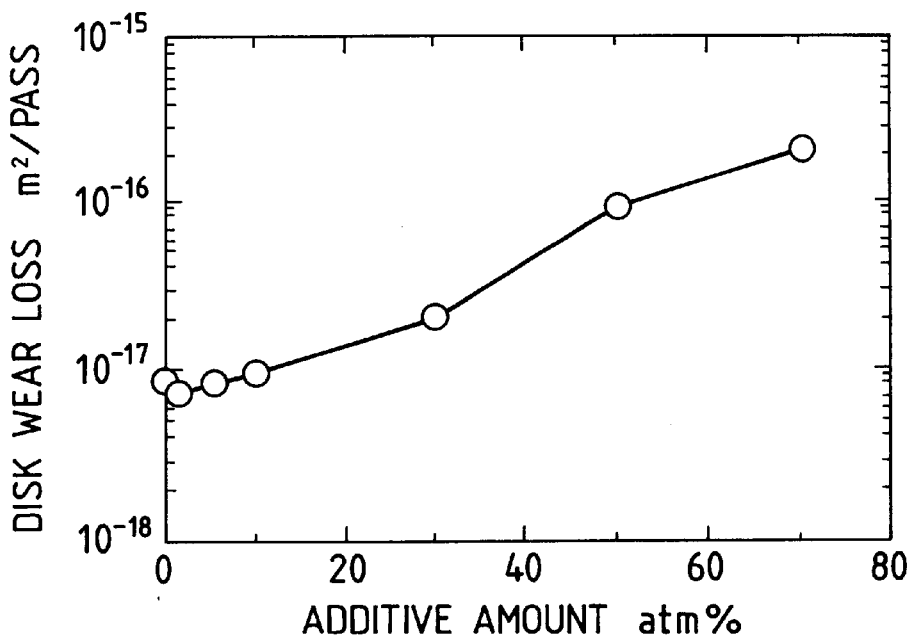
FIG. 1 is a diagram illustrating a relationship between disk wear loss and amount of additive $Nb_2O_5$ in atm % at a circumferential sliding speed of 5 m/s.

A predetermined amount of starting material powder of $TiO_2$ in rutile type crystalline structure having an average particle diameter of 0.6 $\mu$m and many additive components were weighed and a wet type ball milling was performed using water as a medium for 24 hours to fully mix the starting material powder. Thereafter, the slurry was fully dried by a drier, was screened via a sieve and was press-molded via metal molds to form a molded body. The molded body was hot-pressed in a vacuum under applied pressure of 50 MPa at a temperature of 1200° C. to thereby obtain a sintered body. From the sintered body, test pieces, having one face which was polished in a sphere having 30R like a mirror face, were produced for performing a sliding test with a continuous medium type magnetic disk having a carbon protective layer. The sliding test was performed in such a manner that the sphere face side of the sintered body was pressed to the magnetic disk under a load of 0.05N while using a circumferential sliding speed of either 5 m/s or 20 m/s, and one sliding test was performed by rotating the disk 40000 times. The sliding test included measurement of a dynamic friction coefficient during sliding performance and measurement of wear loss of the magnetic disk after sliding performance via a tracer type surface roughness tester. The wear loss of the sliding body was measured using a three dimensional surface configuration measurement apparatus. The test results of the sintered bodies produced as explained above are illustrated in Tables 1 and 2.

For comparison, experiments were carried out on conventional slider material of an $Al_2O_3$ system sintered body ($Al_2O_3$—30 wt % TiC, test Nos. 43 and 87), $ZrO_2$ system sintered body (9 mol % stabilizing $Y_2O_3$—$ZrO_2$, test Nos. 44 and 88) and $TiO_2$ simple substance sintered body (test Nos. 1 and 45).

From Table 1, it is understood that the wear loss at the circumferential speed of 5 m/s of the disks and sliders of the sintered bodies made of a $TiO_2$ simple substance and containing a small amount of additives is less in the order of one magnitude than those of the comparison materials of the $Al_2O_3$ system sintered body and the $ZrO_2$ system sintered body, and their friction coefficients were also low. When the amount of the additives increases up to 50 atm % and 70 atm %, the wear loss of the disks and the sliders increase in comparison with those of the $TiO_2$ simple substance sintered body and their wear losses become close to those of the $Al_2O_3$ system sintered body and $ZrO_2$ system sintered body of the comparison materials.

In contrast to the above, when the circumferential speed is increased up to 20 m/s, it will be seen from Table 2 that the wear losses of the disks and sliders made of the sintered bodies of the $TiO_2$ simple substance and containing a small amount of additives become comparable with those of the $Al_2O_3$ system sintered body and $ZrO_2$ system sintered body of the comparison materials, and further their friction coefficients also increase. In contrast, when the amount of additives is increased, the wear losses of the disks and the sliders are decreased. However, when the amount of additives is increased up to 70 atm %, the wear losses of the disks and sliders become comparable with those of the $Al_2O_3$ system sintered body and $ZrO_2$ system sintered body of the comparison materials. The reasons for this is presumed to result from reduction of hardness of the sintered bodies due to an increase of the additives.

Figure 2:
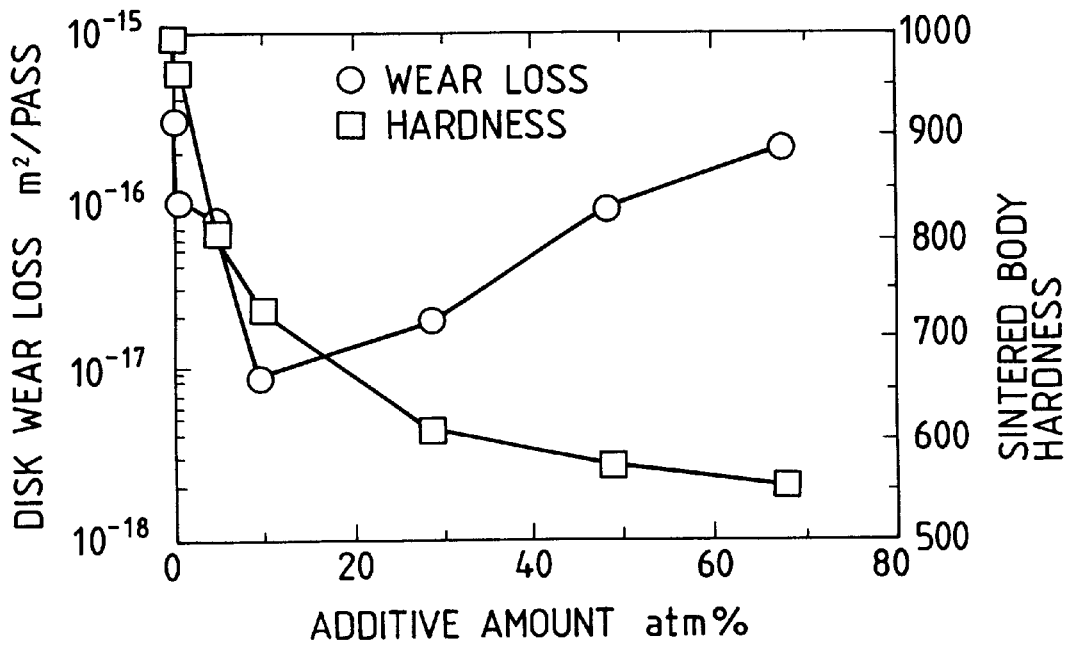
FIG. 2 is a diagram illustrating a relationship between wear loss and amount of additive $Nb_2O_5$ in atm % at a circumferential sliding speed of 20 m/s.
Figure 3A:
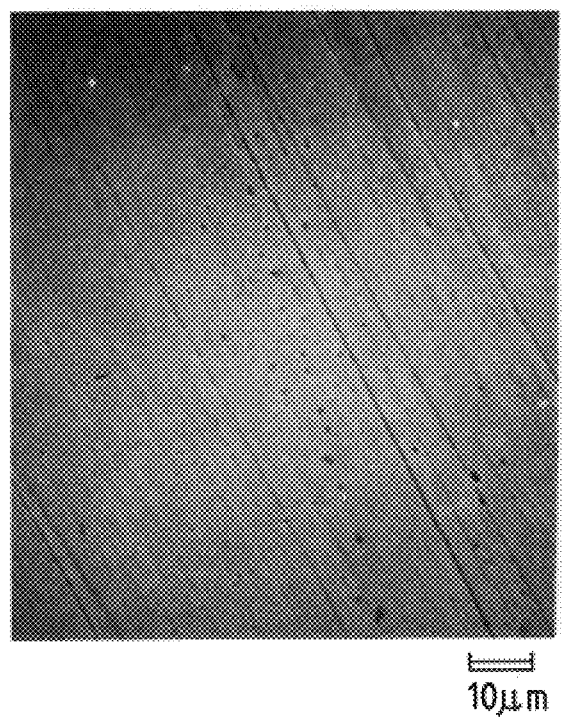
Figure 3B:
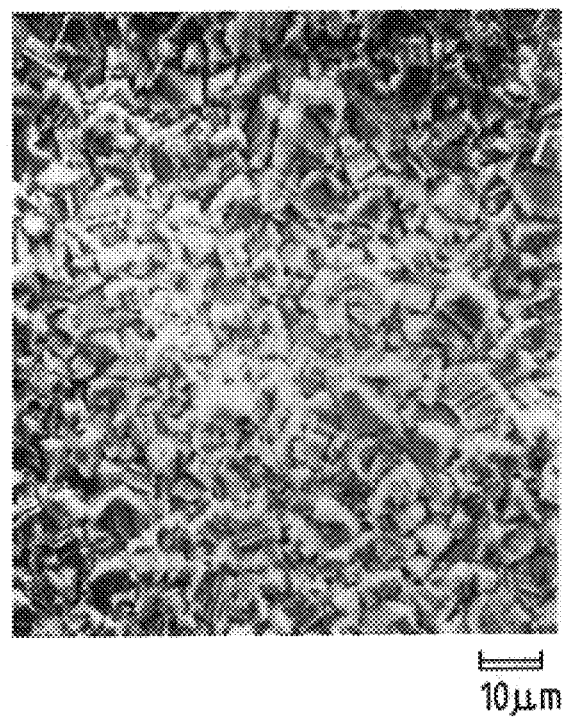
Figure 4A:
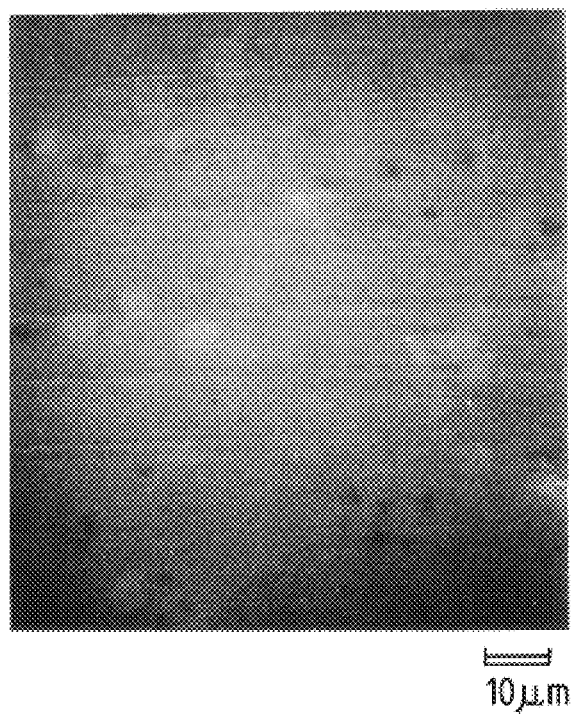
Figure 4B:
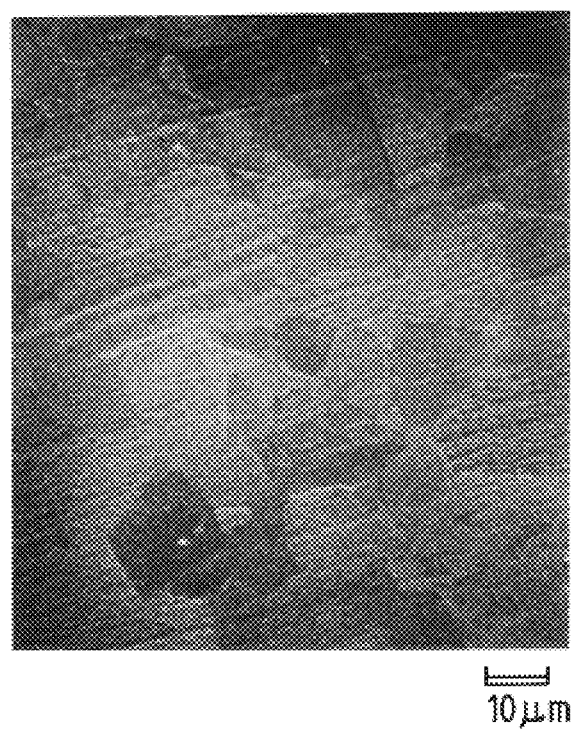

FIG. 1 shows a relationship between the additive amount of $Nb_2O_5$ into $TiO_2$ and disk wear loss at a circumferential speed of 5 m/s, as indicated in Table 1, test Nos. 6–10, and FIG. 2 shows a relationship between the additive amount of $Nb_2O_5$ into $TiO_2$ and disk wear loss at a circumferential speed of 20 m/s and the hardness thereof, as indicated in Table 2, test Nos. 50–54. From the drawings, it is understood that the wear loss at a circumferential speed of 5 m/s monotonously increases depending on an increase of the additive amount, however, at a circumferential speed of 20 m/s, the wear loss minimizes at an additive amount of about 5 atm %, and above and below the additive amount 5 atm %, the wear loss increases. The slidability reduction at a circumferential speed of 5 m/s, in other words disk wear loss increase, due to an additive amount increase, can be reasoned to be due to a $TiO_2$ area ratio reduction associated with an additive amount increase. Namely, although $TiO_2$ exhibits a high slidability at a low circumferential speed, since the additives, such as $Nb_2O_5$, are materials showing a low slidability, the area ratio of $TiO_2$ on the sliding surface decreases and that of the additive increases depending on the increase of the additive, which deteriorates slidability. The cause of the slidability decrease at the circumferential speed of 20 m/s in association with the increase of the additives is presumed because of a hardness reduction of the sintered body, as illustrated in FIG. 2. Namely, although adhesive wear is suppressed by the additives, wear powders produced from the slider due to hardness reduction enter between the slider and the disk and cause wear due to the third bodies, which is presumed to increase the wear loss. Although FIG. 2 shows an example of the additive $Nb_2O_5$, with regard to other additives, substantially the same tendency was observed. As a result, an effective range of the additive amount is preferably more than 2 atm % and less than 50 atm %.

TABLE 1

Sliding Test Result at Circumferential Speed 5 m/s

| *1 | *2 | *3 | *4 | *5 | *6 | *7 |
|---|---|---|---|---|---|---|
| 1 | — | 0 | 5 | 0.15 | $8 \times 10^{-18}$ | $4 \times 10^{-20}$ |
| 2 | $Y_2O_3$ | 10 | 5 | 0.2 | $1 \times 10^{-17}$ | $5 \times 10^{-20}$ |
| 3 | $Y_2O_3$ | 30 | 5 | 0.3 | $2 \times 10^{-17}$ | $6 \times 10^{-20}$ |
| 4 | $Y_2O_3$ | 50 | 5 | 0.35 | $2 \times 10^{-17}$ | $6 \times 10^{-20}$ |
| 5 | $Y_2O_3$ | 70 | 5 | 0.5 | $1 \times 10^{-16}$ | $2 \times 10^{-19}$ |
| 6 | $Nb_2O_5$ | 5 | 5 | 0.2 | $8 \times 10^{-18}$ | $4 \times 10^{-20}$ |
| 7 | $Nb_2O_5$ | 10 | 5 | 0.2 | $9 \times 10^{-18}$ | $4 \times 10^{-20}$ |
| 8 | $Nb_2O_5$ | 30 | 5 | 0.25 | $2 \times 10^{-17}$ | $6 \times 10^{-20}$ |
| 9 | $Nb_2O_5$ | 50 | 5 | 0.4 | $9 \times 10^{-17}$ | $1 \times 10^{-19}$ |
| 10 | $Nb_2O_5$ | 70 | 5 | 0.6 | $2 \times 10^{-16}$ | $4 \times 10^{-19}$ |
| 11 | $ZrO_2$ | 5 | 5 | 0.25 | $9 \times 10^{-18}$ | $4 \times 10^{-20}$ |
| 12 | $ZrO_2$ | 10 | 5 | 0.3 | $1 \times 10^{-17}$ | $6 \times 10^{-20}$ |
| 13 | $ZrO_2$ | 30 | 5 | 0.3 | $1 \times 10^{-17}$ | $6 \times 10^{-20}$ |
| 14 | $ZrO_2$ | 50 | 5 | 0.5 | $1 \times 10^{-16}$ | $2 \times 10^{-19}$ |
| 15 | $ZrO_2$ | 70 | 5 | 0.6 | $2 \times 10^{-16}$ | $4 \times 10^{-19}$ |
| 16 | $Al_2O_3$ | 3 | 5 | 0.25 | $2 \times 10^{-17}$ | $4 \times 10^{-20}$ |
| 17 | $Al_2O_3$ | 10 | 5 | 0.3 | $3 \times 10^{-17}$ | $6 \times 10^{-20}$ |
| 18 | $Al_2O_3$ | 30 | 5 | 0.35 | $3 \times 10^{-17}$ | $9 \times 10^{-20}$ |
| 19 | $Al_2O_3$ | 50 | 5 | 0.4 | $5 \times 10^{-17}$ | $3 \times 10^{-19}$ |
| 20 | $Al_2O_3$ | 70 | 5 | 0.6 | $2 \times 10^{-16}$ | $5 \times 10^{-19}$ |
| 21 | MgO | 2 | 5 | 0.2 | $8 \times 10^{-18}$ | $4 \times 10^{-20}$ |

TABLE 1-continued

Sliding Test Result at Circumferential Speed 5 m/s

| *1 | *2 | *3 | *4 | *5 | *6 | *7 |
|---|---|---|---|---|---|---|
| 22 | MgO | 5 | 5 | 0.25 | $3 \times 10^{-17}$ | $6 \times 10^{-20}$ |
| 23 | MgO | 10 | 5 | 0.35 | $4 \times 10^{-17}$ | $6 \times 10^{-20}$ |
| 24 | MgO | 30 | 5 | 0.5 | $5 \times 10^{-17}$ | $2 \times 10^{-19}$ |
| 25 | MgO | 50 | 5 | 0.55 | $6 \times 10^{-17}$ | $4 \times 10^{-19}$ |
| 26 | $Fe_2O_3$ | 3 | 5 | 0.25 | $9 \times 10^{-18}$ | $2 \times 10^{-19}$ |
| 27 | $Fe_2O_3$ | 10 | 5 | 0.3 | $2 \times 10^{-17}$ | $4 \times 10^{-19}$ |
| 28 | $Fe_2O_3$ | 30 | 5 | 0.35 | $4 \times 10^{-17}$ | $9 \times 10^{-19}$ |
| 29 | $Fe_2O_3$ | 50 | 5 | 0.4 | $4 \times 10^{-17}$ | $2 \times 10^{-18}$ |
| 30 | $Cr_2O_3$ | 5 | 5 | 0.25 | $2 \times 10^{-17}$ | $4 \times 10^{-20}$ |
| 31 | $Cr_2O_3$ | 10 | 5 | 0.3 | $3 \times 10^{-17}$ | $6 \times 10^{-20}$ |
| 32 | $Cr_2O_3$ | 30 | 5 | 0.35 | $4 \times 10^{-17}$ | $6 \times 10^{-20}$ |
| 33 | $Cr_2O_3$ | 50 | 5 | 0.5 | $1 \times 10^{-16}$ | $2 \times 10^{-19}$ |
| 34 | $Yb_2O_3$ | 3 | 5 | 0.25 | $2 \times 10^{-18}$ | $4 \times 10^{-19}$ |
| 35 | $Yb_2O_3$ | 10 | 5 | 0.25 | $2 \times 10^{-18}$ | $4 \times 10^{-19}$ |
| 36 | $Yb_2O_3$ | 30 | 5 | 0.3 | $5 \times 10^{-18}$ | $6 \times 10^{-19}$ |
| 37 | $Yb_2O_3$ | 50 | 5 | 0.5 | $9 \times 10^{-17}$ | $9 \times 10^{-19}$ |
| 38 | $Er_2O_3$ | 3 | 5 | 0.2 | $9 \times 10^{-18}$ | $1 \times 10^{-19}$ |
| 39 | $Er_2O_3$ | 10 | 5 | 0.25 | $2 \times 10^{-17}$ | $5 \times 10^{-19}$ |
| 40 | $Er_2O_3$ | 30 | 5 | 0.3 | $2 \times 10^{-17}$ | $6 \times 10^{-19}$ |
| 41 | $Er_2O_3$ | 50 | 5 | 0.4 | $3 \times 10^{-17}$ | $7 \times 10^{-19}$ |
| 42 | $Er_2O_3$ | 70 | 5 | 0.6 | $2 \times 10^{-16}$ | $9 \times 10^{-19}$ |
| 43 | $Al_2O_3$-30 wt % TiC (comp.) | | 5 | 0.4 | $6 \times 10^{-17}$ | $2 \times 10^{-19}$ |
| 44 | 9 mol % $Y_2O_3$-$ZrO_2$ (comp.) | | 5 | 0.5 | $3 \times 10^{-16}$ | $3 \times 10^{-19}$ |

*1: test No.
*2: additive,
*3: additive amount atm %,
*4: circumferential speed m/s,
*5: friction coefficient,
*6: disc wear loss m$^2$/pass,
*7: slider wear loss m$^3$/m

TABLE 2

Sliding Test Result at Circumferential Speed 20 m/s

| *1 | *2 | *3 | *4 | *5 | *6 | *7 |
|---|---|---|---|---|---|---|
| 45 | — | 0 | 20 | 0.5 | $3 \times 10^{-16}$ | $4 \times 10^{-19}$ |
| 46 | $Y_2O_3$ | 10 | 20 | 0.2 | $2 \times 10^{-17}$ | $4 \times 10^{-20}$ |
| 47 | $Y_2O_3$ | 30 | 20 | 0.25 | $2 \times 10^{-18}$ | $5 \times 10^{-20}$ |
| 48 | $Y_2O_3$ | 50 | 20 | 0.35 | $4 \times 10^{-16}$ | $6 \times 10^{-20}$ |
| 49 | $Y_2O_3$ | 70 | 20 | 0.5 | $3 \times 10^{-18}$ | $2 \times 10^{-19}$ |
| 50 | $Nb_2O_5$ | 5 | 20 | 0.2 | $8 \times 10^{-18}$ | $4 \times 10^{-20}$ |
| 51 | $Nb_2O_5$ | 10 | 20 | 0.2 | $9 \times 10^{-18}$ | $4 \times 10^{-20}$ |
| 52 | $Nb_2O_5$ | 30 | 20 | 0.25 | $2 \times 10^{-18}$ | $6 \times 10^{-20}$ |
| 53 | $Nb_2O_5$ | 50 | 20 | 0.4 | $9 \times 10^{-18}$ | $1 \times 10^{-19}$ |
| 54 | $Nb_2O_5$ | 70 | 20 | 0.6 | $2 \times 10^{-16}$ | $4 \times 10^{-19}$ |
| 55 | $ZrO_2$ | 5 | 20 | 0.25 | $1 \times 10^{-17}$ | $4 \times 10^{-20}$ |
| 56 | $ZrO_2$ | 10 | 20 | 0.3 | $2 \times 10^{-18}$ | $6 \times 10^{-20}$ |
| 57 | $ZrO_2$ | 30 | 20 | 0.3 | $3 \times 10^{-18}$ | $6 \times 10^{-20}$ |
| 58 | $ZrO_2$ | 50 | 20 | 0.5 | $6 \times 10^{-18}$ | $2 \times 10^{-19}$ |
| 59 | $ZrO_2$ | 70 | 20 | 0.6 | $2 \times 10^{-16}$ | $4 \times 10^{-19}$ |
| 60 | $Al_2O_3$ | 3 | 20 | 0.25 | $2 \times 10^{-18}$ | $7 \times 10^{-20}$ |
| 61 | $Al_2O_3$ | 10 | 20 | 0.3 | $1 \times 10^{-18}$ | $6 \times 10^{-20}$ |
| 62 | $Al_2O_3$ | 30 | 20 | 0.35 | $3 \times 10^{-18}$ | $9 \times 10^{-20}$ |
| 63 | $Al_2O_3$ | 50 | 20 | 0.4 | $1 \times 10^{-17}$ | $3 \times 10^{-19}$ |
| 64 | $Al_2O_3$ | 70 | 20 | 0.7 | $2 \times 10^{-16}$ | $5 \times 10^{-19}$ |
| 65 | MgO | 2 | 20 | 0.2 | $5 \times 10^{-17}$ | $7 \times 10^{-20}$ |
| 66 | MgO | 5 | 20 | 0.25 | $2 \times 10^{-17}$ | $4 \times 10^{-20}$ |
| 67 | MgO | 10 | 20 | 0.3 | $4 \times 10^{-18}$ | $6 \times 10^{-20}$ |
| 68 | MgO | 30 | 20 | 0.3 | $5 \times 10^{-18}$ | $2 \times 10^{-19}$ |
| 69 | MgO | 50 | 20 | 0.4 | $4 \times 10^{-17}$ | $4 \times 10^{-19}$ |
| 70 | $Fe_2O_3$ | 3 | 20 | 0.25 | $6 \times 10^{-17}$ | $6 \times 10^{-20}$ |
| 71 | $Fe_2O_3$ | 10 | 20 | 0.3 | $2 \times 10^{-18}$ | $4 \times 10^{-20}$ |
| 72 | $Fe_2O_3$ | 30 | 20 | 0.35 | $3 \times 10^{-18}$ | $9 \times 10^{-19}$ |
| 73 | $Fe_2O_3$ | 50 | 20 | 0.3 | $2 \times 10^{-17}$ | $5 \times 10^{-18}$ |
| 74 | $Cr_2O_3$ | 5 | 20 | 0.3 | $1 \times 10^{-17}$ | $5 \times 10^{-20}$ |
| 75 | $Cr_2O_3$ | 10 | 20 | 0.3 | $3 \times 10^{-18}$ | $6 \times 10^{-20}$ |
| 76 | $Cr_2O_3$ | 30 | 20 | 0.35 | $6 \times 10^{-18}$ | $6 \times 10^{-20}$ |
| 77 | $Cr_2O_3$ | 50 | 20 | 0.5 | $1 \times 10^{-17}$ | $2 \times 10^{-19}$ |
| 78 | $Yb_2O_3$ | 3 | 20 | 0.35 | $9 \times 10^{-18}$ | $4 \times 10^{-20}$ |
| 79 | $Yb_2O_3$ | 10 | 20 | 0.25 | $4 \times 10^{-18}$ | $4 \times 10^{-19}$ |

TABLE 2-continued

Sliding Test Result at Circumferential Speed 20 m/s

| *1 | *2 | *3 | *4 | *5 | *6 | *7 |
|---|---|---|---|---|---|---|
| 80 | $Yb_2O_3$ | 30 | 20 | 0.3 | $3 \times 10^{-18}$ | $6 \times 10^{-19}$ |
| 81 | $Yb_2O_3$ | 50 | 20 | 0.4 | $9 \times 10^{-17}$ | $9 \times 10^{-19}$ |
| 82 | $Er_2O_3$ | 3 | 20 | 0.3 | $1 \times 10^{-17}$ | $1 \times 10^{-19}$ |
| 83 | $Er_2O_3$ | 10 | 20 | 0.25 | $2 \times 10^{-17}$ | $5 \times 10^{-19}$ |
| 84 | $Er_2O_3$ | 30 | 20 | 0.3 | $2 \times 10^{-17}$ | $6 \times 10^{-19}$ |
| 85 | $Er_2O_3$ | 50 | 20 | 0.4 | $3 \times 10^{-16}$ | $7 \times 10^{-19}$ |
| 86 | $Er_2O_3$ | 70 | 20 | 0.6 | $2 \times 10^{-16}$ | $9 \times 10^{-19}$ |
| 87 | $Al_2O_3$-30 wt % TiC (comp.) | | 20 | 0.3 | $1 \times 10^{-16}$ | $2 \times 10^{-19}$ |
| 88 | 9 mol % $Y_2O_3$—$ZrO_2$ (comp.) | | 20 | 0.4 | $3 \times 10^{-16}$ | $3 \times 10^{-19}$ |

*1: test No.
*2: additive,
*3: additive amount atm %,
*4: circumferential speed m/s,
*5: friction coefficient,
*6: disc wear loss $m^2$/pass,
*7: slider wear loss $m^3$/m FIGS. 3(a) and 3(b) and FIGS. 4(a) and 4(b) respectively show SEM photographs illustrating a change of the surface condition of a $TiO_2$ simple substance sintered body and of a $TiO_2$—5 atm % Nb sintered body before and after heat treatment.

The surface of the sintered body of TiO 2 simple substance changes after the heat treatment; whereas, on the other hand, no substantial change of the surface condition of the sintered body of $TiO_2$—5 atm % Nb after heat treatment can be observed.

Figure 5:
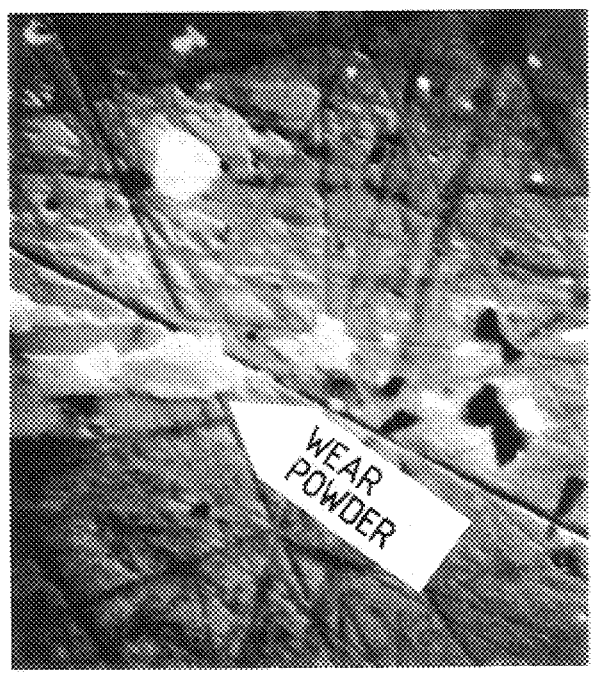
FIG. 5 is a SEM photograph illustrating an adhering condition of wear powder on the crystalline structure of a $TiO_2$ sinter body.
Figure 6:
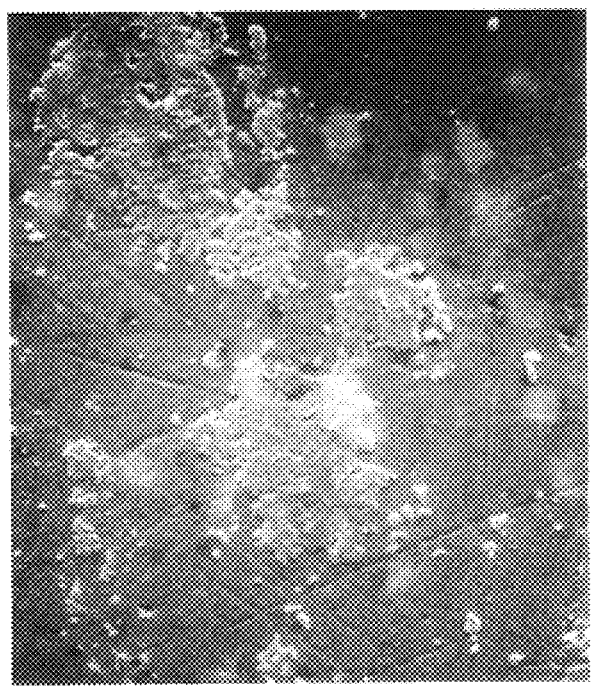
FIG. 6 is a SEM photograph illustrating an adhering condition of wear powder on the crystalline structure of a $TiO_2$—5 atm % $Nb_2O_5$ sinter body.

FIG. 5 and FIG. 6 show SEM photographs illustrating wear powders adhering to surface portions of both samples, in test Nos. 45 and 50 after being subjected to the sliding test at a circumferential speed of 20 m/s. In case of the sintered body of $TiO_2$ simple substance, as illustrated in FIG. 5, the wear powder firmly adheres in film form on the surface thereof, which is presumed to result in adhesive wear; whereas, on the other hand, in the case of the sintered body of $TiO_2$—5 atm % Nb, as illustrated in FIG. 6, the wear powder seems to have remained in a powder like state on the surface thereof. Therefore, it is presumed that the rate of adhesive wear is extremely limited.

Through adding the additives illustrated in Tables 1 and 2 into $TiO_2$, the adhesive wear at a high circumferential speed is suppressed and materials providing limited wear and higher slidability to the disk and sliders at any circumferential speed are obtained.

Embodiment 2

Figure 7:
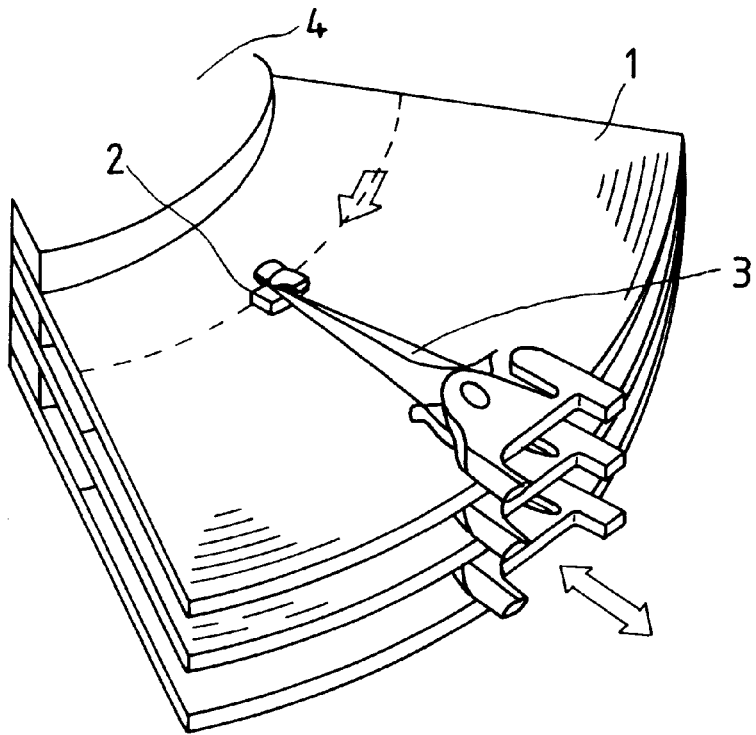
FIG. 7 is a perspective view of a major portion of a magnetic disk device to which the present invention is applied.
Figure 8:
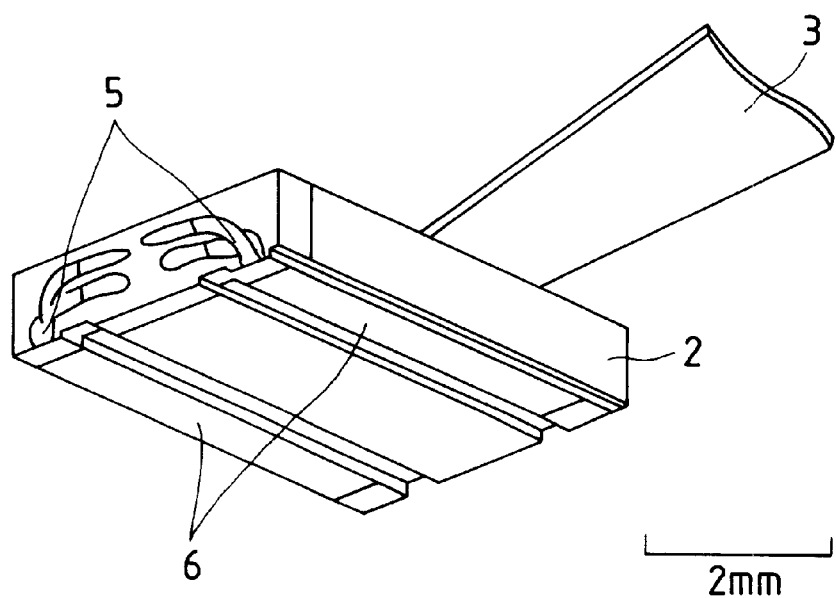
FIG. 8 is a perspective view of a magnetic head slider to which the present invention is applied.

FIG. 7 and FIG. 8 are, respectively, perspective views of a major portion of a magnetic disk device and a magnetic head slider to which the present invention is applied, wherein 1 is a magnetic disk, 2 a magnetic head slider, 3 a leaf spring or simbal, 4 a rotating shaft, 5 a magnetic head element, 6 a sliding face of the magnetic head slider.

On the floating face of the magnetic head slider 2, as illustrated in FIG. 8, which was produced from a base plate of $Al_2O_3$ system material of $Al_2O_3$—30 wt% TiC, a composite film of $TiO_2$ and $ZrO_2$ having a thickness of 1 μm was formed by spattering a target containing $TiO_2$ and $ZrO_2$ in a 3:1 ratio. The thus produced slider 2 was assembled into an actual magnetic disk device using a continuous medium type magnetic disk having a carbon protective film and was subjected to a so called contact start stop (CSS) test 100000 times, which repeats the ON/OFF operation of the disk rotation at a predetermined interval, and thereafter the wear of the disk was measured. For comparison, sliders made of $Al_2O_3$ system material of $Al_2O_3$—30 wt % TiC and of $ZrO_2$ system material of 9 mol % $Y_2O_3$ stabilized $ZrO_2$ formed of no spattered film were tested in a like manner. Wear loss of the disk when combined with the slider made of $Al_2O_3$ system material formed of the composite spattered film was minimum; whereas, wear loss of the disk when combined with the sliders made of $Al_2O_3$ system material and of $ZrO_2$ system material formed of no spatter film was substantial and the same degree.

Embodiment 3

Starting material powder $TiO_2$ containing Fe of 5 atm % was mixed with $Al_2O_3$ or $ZrO_2$ in the amount of 30 vol % with respect to $TiO_2$, heated at a temperature rising speed of 10° C./min under pressure application of 30 MPa, held at a temperature 1200° C., 1400° C. or 1600° C. for one hour and hot-press-sintered to obtained sintered bodies. For the thus obtained sintered bodies, the sliding test like in the embodiment 1, workability test and X-ray diffraction for structural analysis were performed. The results thereof are indicated in Table 3.

TABLE 3

Sintered Body Characteristic Variation Depending on Sintering Temperature

| *1 | *2 | *3 | *8 | *4 | *6 | *7 | *9 | *10 |
|---|---|---|---|---|---|---|---|---|
| 89 | $Al_2O_3$ | 30 | 1200 | 5 | $3 \times 10^{-17}$ | $9 \times 10^{-20}$ | 4 | $TiO_2 + Al_2O_3$ |
| 90 | $Al_2O_3$ | 30 | 1400 | 5 | $2 \times 10^{-17}$ | $7 \times 10^{-20}$ | 4 | $TiO_2 + Al_2O_3$ |
| 91 | $Al_2O_3$ | 30 | 1600 | 5 | $9 \times 10^{-17}$ | $6 \times 10^{-18}$ | 10 | $TiO_2 + Al_2TiO_5$ |
| 92 | $Al_2O_3$ | 30 | 1200 | 20 | $5 \times 10^{-17}$ | $2 \times 10^{-19}$ | 4 | $TiO_2 + Al_2O_3$ |
| 93 | $Al_2O_3$ | 30 | 1400 | 20 | $6 \times 10^{-17}$ | $4 \times 10^{-19}$ | 4 | $TiO_2 + Al_2O_3$ |
| 94 | $Al_2O_3$ | 30 | 1600 | 20 | $3 \times 10^{-18}$ | $9 \times 10^{-18}$ | 10 | $TiO_2 + Al_2TiO_5$ |
| 95 | $ZrO_2$ | 30 | 1200 | 5 | $1 \times 10^{-17}$ | $6 \times 10^{-20}$ | 2 | $TiO_2 + ZrO_2$ |
| 96 | $ZrO_2$ | 30 | 1400 | 5 | $3 \times 10^{-17}$ | $9 \times 10^{-20}$ | 2 | $TiO_2 + ZrO_2$ |
| 97 | $ZrO_2$ | 30 | 1600 | 5 | $4 \times 10^{-16}$ | $7 \times 10^{-18}$ | 12 | $TiO_2 + ZrTiO_4$ |
| 98 | $ZrO_2$ | 30 | 1200 | 20 | $3 \times 10^{-17}$ | $6 \times 10^{-20}$ | 2 | $TiO_2 + ZrO_2$ |
| 99 | $ZrO_2$ | 30 | 1400 | 20 | $2 \times 10^{-17}$ | $7 \times 10^{-20}$ | 2 | $TiO_2 + ZrO_2$ |
| 100 | $ZrO_2$ | 30 | 1600 | 20 | $4 \times 10^{-18}$ | $9 \times 10^{-18}$ | 12 | $TiO_2 + ZrTiO_4$ |
| 101 | $Nb_2O_5$ | 30 | 1200 | 5 | $2 \times 10^{-17}$ | $6 \times 10^{-20}$ | 3 | $TiO_2 + Nb_2TiO_7$ |
| 102 | $Nb_2O_5$ | 30 | 1400 | 5 | $3 \times 10^{-17}$ | $9 \times 10^{-20}$ | 3 | $TiO_2 + Nb_2TiO_7$ |
| 103 | $Nb_2O_5$ | 30 | 1600 | 5 | $4 \times 10^{-18}$ | $7 \times 10^{-19}$ | 3 | $TiO_2 + Nb_2TiO_7$ |

TABLE 3-continued

Sintered Body Characteristic Variation Depending on Sintering Temperature

| *1 | *2 | *3 | *8 | *4 | *6 | *7 | *9 | *10 |
|---|---|---|---|---|---|---|---|---|
| 104 | $Nb_2O_5$ | 30 | 1200 | 20 | $2 \times 10^{-17}$ | $6 \times 10^{-20}$ | 3 | $TiO_2 + Nb_2TiO_7$ |
| 105 | $Nb_2O_5$ | 30 | 1400 | 20 | $2 \times 10^{-17}$ | $7 \times 10^{-20}$ | 3 | $TiO_2 + Nb_2TiO_7$ |
| 106 | $Nb_2O_5$ | 30 | 1600 | 20 | $4 \times 10^{-18}$ | $9 \times 10^{-18}$ | 3 | $TiO_2 + Nb_2TiO_7$ |

*1: test No.,
*2: additive,
*3: additive amount atm %,
*4: circumferential speed m/s,
*6: disc wear loss $m^2$/pass,
*7: slider wear loss $m^3$/m,
*8: sintering temperature ° C.,
*9: maximum pitching size μm,
*10: composition From Table 3, it will be seen that with regard to the bodies sintered at a temperature of 1600° C. $Al_2TiO_5$ or $ZrTiO_3$ is yielded therein, wear loss of the disks and sliders at the sliding test is significant in comparison with other bodies sintered at lower temperatures, and their workability is also poor. On the other hand, with regard to bodies sintered at a temperature of 1200° C. or 1400° C., $Al_2TiO_5$ or $ZrTiO_3$ was not yielded and $TiO_2$, $Al_2O_3$ and $ZrO_2$ are contained independently. Further, when investigating the spectrum peak position of $TiO_2$ in detail, the position is somewhat displaced from that for a $TiO_2$ simple substance. Namely, it is assumed that metal ions of $Al_2O_3$ or $ZrO_2$ are contained in the crystalline of $TiO_2$ in the form of a solid solution. Accordingly, it will be understood that adhesive wear can be suppressed by incorporating the metal ions in the form of a solid solution into $TiO_2$, without necessarily forming composite oxides with $TiO_2$.

$Al_2TiO_5$ and $ZrTiO_3$, in particular $Al_2TiO_5$, are instable crystallines and show a lower Young's modulus, so that it is necessary to sinter the bodies at a temperature below 1400° C. so as not to yield such compounds.

Further, a $TiO_2$ starting material powder containing $Nb_2O_5$ in an amount capable of producing $Nb_2TiO_7$ of 30 atm % was likely sintered and evaluated. The results are indicated in the same Table. In this example, the composition in the form of a mixing phase of $TiO_2$ and $Nb_2TiO_7$ never changes even if the sintering temperature is varied. The X-ray spectrum peak position of the thus produced $TiO_2$ of the sintered body is also somewhat displaced from that for a $TiO_2$ simple substance, therefore, it is also assumed that Nb ions are contained in the crystalline of $TiO_2$ in the form of a solid solution. Namely, the sintered body consisted of a mixing phase of $TiO_2$ containing a solid solution of Nb ions and $Nb_2TiO_7$. However, in the present example, the slidability and the workability thereof are not deteriorated even if composite oxides are yielded and no characteristic variation is caused by the sintering temperature.

Embodiment 4

A $TiO_2$ starting material containing oxides, bromides, carbonates, chlorides, fluorides, nitrates or hydroxides of Mg in an amount capable of producing their metal ions of 30 atm % with respect to $TiO_2$ was sintered at a temperature of 1300° C. and was evaluated in the same manner as in embodiment 3. The results are indicated in Table 4. It will be understood from Table 4 that the composition of the resultant sintered bodies is substantially the same even if the additive compound structures are different and the results of the sliding test and the workability test are also substantially the same. Based on the instant results, it is noted that Mg ions are effective for improving the slidability. The same experiments as in the above were performed on other metal ions Y, Yb, Er, Fe, Cr, Zr and Al, and substantially the same results are confirmed.

TABLE 4

Sintered Body Characteristic Variation Depending on Additive Compound Structure Difference

| *1 | *2 | *3 | *8 | *4 | *6 | *7 | *9 | *10 |
|---|---|---|---|---|---|---|---|---|
| 107 | MgO | 30 | 1300 | 5 | $3 \times 10^{-17}$ | $9 \times 10^{-20}$ | 4 | $TiO_2 + MgTi_2O_5$ |
| 108 | $MgBr_2$ | 30 | 1300 | 5 | $2 \times 10^{-17}$ | $7 \times 10^{-20}$ | 5 | $TiO_2 + MgTi_2O_5$ |
| 109 | $MgCO_3$ | 30 | 1300 | 5 | $9 \times 10^{-17}$ | $6 \times 10^{-20}$ | 5 | $TiO_2 + MgTi_2O_5$ |
| 110 | MgO | 30 | 1300 | 5 | $5 \times 10^{-17}$ | $5 \times 10^{-20}$ | 4 | $TiO_2 + MgTi_2O_5$ |
| 111 | $MgF_2$ | 30 | 1300 | 5 | $6 \times 10^{-17}$ | $4 \times 10^{-18}$ | 5 | $TiO_2 + MgTi_2O_5$ |
| 112 | $Mg(NO_3)_2$ | 30 | 1300 | 5 | $3 \times 10^{-17}$ | $9 \times 10^{-20}$ | 4 | $TiO_2 + MgTi_2O_5$ |
| 113 | $Mg(OH)_2$ | 30 | 1300 | 5 | $3 \times 10^{-17}$ | $5 \times 10^{-20}$ | 5 | $TiO_2 + MgTi_2O_5$ |
| 114 | MgO | 30 | 1300 | 20 | $7 \times 10^{-17}$ | $5 \times 10^{-20}$ | 4 | $TiO_2 + MgTi_2O_5$ |
| 115 | $MgBr_2$ | 30 | 1300 | 20 | $4 \times 10^{-15}$ | $2 \times 10^{-18}$ | 5 | $TiO_2 + MgTi_2O_5$ |
| 116 | $MgCO_3$ | 30 | 1300 | 20 | $5 \times 10^{-17}$ | $3 \times 10^{-19}$ | 5 | $TiO_2 + MgTi_2O_5$ |
| 117 | $MgCl_2$ | 30 | 1300 | 20 | $5 \times 10^{-17}$ | $3 \times 10^{-18}$ | 4 | $TiO_2 + MgTi_2O_5$ |
| 118 | $MgF_2$ | 30 | 1300 | 20 | $5 \times 10^{-17}$ | $3 \times 10^{-19}$ | 5 | $TiO_2 + MgTi_2O_5$ |

TABLE 4-continued

Sintered Body Characteristic Variation Depending on Additive Compound Structure Difference

| *1 | *2 | *3 | *8 | *4 | *6 | *7 | *9 | *10 |
|---|---|---|---|---|---|---|---|---|
| 119 | $Mg(NO_3)_2$ | 30 | 1300 | 20 | $5 \times 10^{-17}$ | $3 \times 10^{-19}$ | 4 | $TiO_2 + MgTi_2O_5$ |
| 120 | $Mg(OH)_2$ | 30 | 1300 | 20 | $5 \times 10^{-17}$ | $3 \times 10^{-19}$ | 5 | $TiO_2 + MgTi_2O_5$ |

*1: test No.,
*2: additive,
*3: additive amount atm %,
*4: circumferential speed m/s,
*6: disc wear loss m$^2$/pass,
*7: slider wear loss m$^3$/m,
*8: sintering temperature ° C.,
*9: maximum pitching size μm,
*10: composition

Embodiment 5

A starting material powder containing $TiO_2$ and $Y_2O_3$ in an amount capable of producing $Y_2TiO_7$ of 30 mol % was mixed respectively with one of the additives of SiC in an amount of 10, 20, 30 and 40 vol %, TiC, ZrC, VC, $B_4C$, HfC, TaC, WC, $CaB_6$, $TaB_6$, $TiB_2$ and $ZrB_2$ in an amount of 30 vol %, and the mixtures were held in a vacuum at a temperature of 1200° C. for one hour under a pressure application of 30 MPa to thereby obtain sintered bodies. These sintered bodies were subjected to the same sliding test and workability test as in embodiment 3.

The test results are indicated in Table 5.

TABLE 5

Sintered Body Characteristic Containing Carbide or Boride Additive (Following Additives Are Further Added to Starting Material Powder of $TiO_2$ 30 atm % $Y_2O_3$)

| *1 | *2 | *3 | *8 | *4 | *6 | *7 | *9 | *10 |
|---|---|---|---|---|---|---|---|---|
| 3 | — | 0 | 1300 | 5 | $3 \times 10^{-17}$ | $9 \times 10^{-20}$ | 6 | $TiO_2 + Y_2Ti_2O_7 + SiC$ |
| 121 | SiC | 10 | 1300 | 5 | $6 \times 10^{-17}$ | $4 \times 10^{-18}$ | 4 | $TiO_2 + Y_2Ti_2O_7 + SiC$ |
| 122 | SiC | 20 | 1300 | 5 | $1 \times 10^{-14}$ | $7 \times 10^{-19}$ | 3 | $TiO_2 + Y_2Ti_2O_7 + SiC$ |
| 123 | SiC | 30 | 1300 | 5 | $3 \times 10^{-14}$ | $9 \times 10^{-19}$ | 3 | $TiO_2 + Y_2Ti_2O_7 + SiC$ |
| 124 | SiC | 40 | 1300 | 5 | $7 \times 10^{-17}$ | $6 \times 10^{-18}$ | 3 | $TiO_2 + Y_2Ti_2O_7 + SiC$ |
| 125 | TiC | 30 | 1300 | 5 | $2 \times 10^{-17}$ | $7 \times 10^{-20}$ | 3 | $TiO_2 + Y_2Ti_2O_7 + SiC$ |
| 126 | ZrC | 30 | 1300 | 5 | $9 \times 10^{-17}$ | $6 \times 10^{-20}$ | 4 | $TiO_2 + Y_2Ti_2O_7$ ZrC |
| 127 | VC | 30 | 1300 | 5 | $5 \times 10^{-17}$ | $5 \times 10^{-20}$ | 4 | $TiO_2 + Y_2Ti_2O_7$ VC |
| 128 | $B_4C$ | 30 | 1300 | 5 | $6 \times 10^{-17}$ | $4 \times 10^{-18}$ | 3 | $TiO_2 + Y_2Ti_2O_7$ $B_4C$ |
| 129 | HfC | 30 | 1300 | 5 | $3 \times 10^{-17}$ | $9 \times 10^{-20}$ | 4 | $TiO_2 + Y_2Ti_2O_7$ HfC |
| 130 | TaC | 30 | 1300 | 5 | $3 \times 10^{-17}$ | $6 \times 10^{-20}$ | 3 | $TiO_2 + Y_2Ti_2O_7$ TaC |
| 131 | WC | 30 | 1300 | 5 | $7 \times 10^{-17}$ | $5 \times 10^{-20}$ | 4 | $TiO_2 + Y_2Ti_2O_7$ WC |
| 132 | $CaB_6$ | 30 | 1300 | 5 | $4 \times 10^{-17}$ | $2 \times 10^{-18}$ | 3 | $TiO_2 + Y_2Ti_2O_7$ $CaB_6$ |
| 133 | $TaB_6$ | 30 | 1300 | 5 | $5 \times 10^{-17}$ | $3 \times 10^{-18}$ | 3 | $TiO_2 + Y_2Ti_2O_7$ $TaB_6$ |
| 134 | $TiB_2$ | 30 | 1300 | 5 | $5 \times 10^{-17}$ | $3 \times 10^{-19}$ | 4 | $TiO_2 + Y_2Ti_2O_7$ $TiB_2$ |
| 135 | $ZrB_2$ | 30 | 1300 | 5 | $5 \times 10^{-17}$ | $3 \times 10^{-19}$ | 4 | $TiO_2 + Y_2Ti_2O_7$ $ZrB_2$ |
| 47 | — | 0 | 1300 | 20 | $3 \times 10^{-17}$ | $9 \times 10^{-20}$ | 4 | $TiO_2 + Y_2Ti_2O_7$ SiC |
| 136 | SiC | 10 | 1300 | 20 | $3 \times 10^{-17}$ | $9 \times 10^{-20}$ | 3 | $TiO_2 + Y_2Ti_2O_7$ SiC |
| 137 | SiC | 20 | 1300 | 20 | $3 \times 10^{-17}$ | $9 \times 10^{-20}$ | 4 | $TiO_2 + Y_2Ti_2O_7$ SiC |
| 138 | SiC | 30 | 1300 | 20 | $3 \times 10^{-17}$ | $9 \times 10^{-20}$ | 3 | $TiO_2 + Y_2Ti_2O_7$ SiC |
| 139 | SiC | 40 | 1300 | 20 | $3 \times 10^{-17}$ | $9 \times 10^{-20}$ | 4 | $TiO_2 + Y_2Ti_2O_7$ SiC |
| 140 | TiC | 30 | 1300 | 20 | $2 \times 10^{-17}$ | $7 \times 10^{-20}$ | 4 | $TiO_2 + Y_2Ti_2O_7$ SiC |
| 141 | ZrC | 30 | 1300 | 20 | $9 \times 10^{-17}$ | $6 \times 10^{-20}$ | 3 | $TiO_2 + Y_2Ti_2O_7$ ZrC |
| 142 | VC | 30 | 1300 | 20 | $5 \times 10^{-17}$ | $5 \times 10^{-20}$ | 4 | $TiO_2 + Y_2Ti_2O_7$ VC |
| 143 | $B_4C$ | 30 | 1300 | 20 | $6 \times 10^{-17}$ | $4 \times 10^{-18}$ | 3 | $TiO_2 + Y_2Ti_2O_7$ $B_4C$ |
| 144 | HfC | 30 | 1300 | 20 | $3 \times 10^{-17}$ | $9 \times 10^{-20}$ | 4 | $TiO_2 + Y_2Ti_2O_7$ HFC |
| 145 | TaC | 30 | 1300 | 20 | $3 \times 10^{-17}$ | $6 \times 10^{-20}$ | 4 | $TiO_2 + Y_2Ti_2O_7$ TaC |
| 146 | WC | 30 | 1300 | 20 | $7 \times 10^{-17}$ | $5 \times 10^{-20}$ | 4 | $TiO_2 + Y_2Ti_2O_7$ WC |
| 147 | $CaB_6$ | 30 | 1300 | 20 | $4 \times 10^{-17}$ | $2 \times 10^{-18}$ | 4 | $TiO_2 + Y_2Ti_2O_7$ $CaB_6$ |
| 148 | $TaB_6$ | 30 | 1300 | 20 | $5 \times 10^{-17}$ | $3 \times 10^{-18}$ | 3 | $TiO_2 + Y_2Ti_2O_7$ $TaB_6$ |

TABLE 5-continued

Sintered Body Characteristic Containing Carbide or Boride Additive
(Following Additives Are Further Added to Starting Material
Powder of TiO$_2$ 30 atm % Y$_2$O$_3$)

| *1 | *2 | *3 | *8 | *4 | *6 | *7 | *9 | *10 |
|---|---|---|---|---|---|---|---|---|
| 149 | TiB$_7$ | 30 | 1300 | 20 | $5 \times 10^{-17}$ | $3 \times 10^{-18}$ | 3 | TiO$_2$ + Y$_2$Ti$_2$O$_7$ TiB$_7$ |
| 150 | ZrB$_2$ | 30 | 1300 | 20 | $5 \times 10^{-17}$ | $3 \times 10^{-18}$ | 4 | TiO$_2$ + Y$_2$Ti$_2$O$_7$ ZrB$_7$ |

*1: test No.,
*2: additive,
*3: additive amount atm %,
*4: circumferential speed m/s,
*6: disc wear loss m$^2$/pass,
*7: slider wear loss m$^3$/m,
*8: sintering temperature ° C.,
*9: maximum pitching size µm,
*10: composition From Table 5 it is understood that the workability of the sintered bodies containing SiC increases with an increase of the additive amount, but the slidability thereof decreases. Further, the workability thereof saturates at the additive amount of 30 vol % beyond which no substantial additive effect can be observed, but only causes a decrease of the slidability. With regard to other additives than SiC, the variation of the slidability and workability in connection with the additive amount showed substantially the same tendency as in the case of SiC. The additive amount of 30 vol % is considered to be an upper limit.

Embodiment 6

A sintered body, formed by mixing TiO$_2$ and ZrO$_2$ of 10 atm % and by sintering the mixture at a temperature of 1200° C. under a pressure application of 30 MPa, was ground and polished into the shape of the magnetic head slider 2 as illustrated in FIG. 8. The shaped magnetic head slider 2 was secured to the leaf spring or simbal 3 and then assembled into the actual magnetic disk device in the form of head disk assembly, as illustrated in FIG. 7, to perform the C.S.S. test. Disk wear loss after 100000 times of contact start and stops with the slider of the present embodiment was compared those with comparison Al$_2$O$_3$ system material of Al$_2$O$_3$—30 wt % TiC and with comparison ZrO$_2$ system material of 9 mol % Y$_2$O$_3$ stabilized ZrO$_2$. The result of the comparison showed that the wear loss with the Al$_2$O$_3$ system material of Al$_2$O$_3$—30 wt % TiC and with comparison ZrO$_2$ system material of 9 mol % Y$_2$O$_3$ stabilized ZrO$_2$ is an order of $10^{-16}$ m$^2$/pass, but the material of the present embodiment is in an order of $10^{-18}$ m$^2$/pass. Accordingly, the material of the present embodiment was confirmed to show a higher slidability, in that low wear loss and low friction were obtained, when applied to an actual device.

Embodiment 7

A starting material powder of TiO$_2$ in rutile type crystalline structure having an average particle diameter of 0.6 µm and two kinds of metal oxides forming a composite oxide with titanium oxide in an amount capable of producing metal ions of 10 atm % with respect to Ti were weighed and a wet type ball milling was performed using water as a medium for 24 hours to fully mix the starting material powder. Thereafter, the slurry was fully dried by a drier, was screened via a sieve and was press-molded via metal molds to form a molded body. The molded body was hot-pressed in nitrogen gas at two atmospheric pressures under applied pressure of 50 MPa at a temperature of 1200° C. to thereby obtain a sintered body. The sintered body was processed into the magnetic head slider, as illustrated in FIG. 8, and was assembled into an actual device to perform the sliding test. In the test, a so-called incremental seek test was performed in which displacement of the head from an inner circumference to an outer circumference of the disk is repeated at a predetermined displacement speed while rotating the disk at a predetermined speed, and the wear loss of the disk was measured after 100000 times of such displacement via a tracer type surface roughness tester. The experimental results are indicated in Table 6.

From Table 6, it will be understood that the wear loss of the disks with all of the TiO$_2$—TiO$_2$ composite oxide sinter bodies is less, in order of one magnitude, than those with the comparison material of Al$_2$O$_3$—TiC sintered body and the comparison material of 9 mol % Y$_2$O$_3$ stabilized ZrO$_2$ sintered body.

TABLE 6

Sliding Characteristic of Slider Containing Plurality of Additives

| *1 | *11 | *12 | *13 | *14 | *8 | *6 |
|---|---|---|---|---|---|---|
| 151 | Nb$_2$O$_5$ | 10 | Al$_2$O$_3$ | 10 | 1200 | $9 \times 10^{-17}$ |
| 152 | Y$_2$O$_3$ | 10 | ZrO$_2$ | 10 | 1200 | $2 \times 10^{-17}$ |
| 153 | MgO | 10 | Fe$_2$O$_3$ | 10 | 1200 | $9 \times 10^{-17}$ |
| 154 | Er$_2$O$_3$ | 10 | Yb$_2$O$_3$ | 10 | 1200 | $5 \times 10^{-17}$ |
| 155 | Cr$_2$O$_3$ | 10 | SrO | 10 | 1200 | $6 \times 10^{-17}$ |
| 156 | MnO | 10 | Al$_2$O$_3$ | 10 | 1200 | $3 \times 10^{-17}$ |
| 157 | ZnO | 10 | ZrO$_2$ | 10 | 1200 | $1 \times 10^{-17}$ |
| 158 | SnO | 10 | ZrO$_2$ | 10 | 1200 | $3 \times 10^{-17}$ |
| 159 | PnO | 10 | ZrO$_2$ | 10 | 1200 | $4 \times 10^{-17}$ |
| 160 | Nb$_2$O$_5$ | 10 | ZrO$_2$ | 10 | 1200 | $3 \times 10^{-17}$ |
| 161 | ZrO$_2$ | 10 | Al$_2$O$_3$ | 10 | 1200 | $2 \times 10^{-17}$ |
| 162 | ZrO$_2$ | 10 | MgO | 10 | 1200 | $4 \times 10^{-17}$ |
| 163 | Nb$_2$O$_5$ | 10 | ZrO$_2$ | 10 | 1200 | $2 \times 10^{-17}$ |
| 164 | Nb$_2$O$_5$ | 10 | MgO | 10 | 1200 | $3 \times 10^{-17}$ |
| 165 | Nb$_2$O$_5$ | 10 | Er$_2$O$_3$ | 10 | 1200 | $4 \times 10^{-17}$ |
| 166 | Nb$_2$O$_5$ | 10 | Cr$_2$O$_3$ | 10 | 1200 | $2 \times 10^{-17}$ |
| 167 | Nb$_2$O$_5$ | 10 | Fe$_2$O$_3$ | 10 | 1200 | $2 \times 10^{-17}$ |
| 168 | Al$_2$O$_3$-30 wt % TiC (comp.) | | | | | $8 \times 10^{-16}$ |
| 169 | 9 mol % Y$_2$O$_3$—ZrO$_2$ (comp.) | | | | | $7 \times 10^{-16}$ |

*1: test No.,
*6: disc wear loss m$^2$/pass,
*8: sintering temperature ° C.,
*11: additive A,
*12: additive A amount atm %,
*13: additive B,
*14: additive B amount atm %

According to the present invention, a magnetic disk device is obtained that limits the wear of both the disk protective film and the slider during sliding between the continuous medium type magnetic disk and slider, that shows a higher reliability over long time span and that achieves a higher recording density.

We claim:

1. A magnetic head slider, which is combined with a continuous medium type magnetic disk having a carbon protective layer, said magnetic head slider being formed of a sintered body essentially consisting of titanium oxide as the major component thereof and at least one material selected from the group consisting of Y, Yb, Nb, Mg, Er, Fe, Cr, Zr and Al in an amount of from 2 atm % to 50 atm % with respect to the titanium oxide, wherein the at least one material forms a composite oxide with the titanium oxide which suppress chemical reaction of the titanium oxide with the carbon during sliding contact of the magnetic head slider with the continuous medium type magnetic disk, thereby reducing wear between surfaces of the magnetic head slider and magnetic disk, and wherein said sintered body further contains a carbide, said carbide being contained in an amount up to 30 volume %, selected from the group consisting of SiC, TiC, ZrC, NbC, VC, BC, HfC, TaC and WC.

2. A magnetic head slider according to claim 1, wherein the sintering temperature of said body is selected below 1400° C.

3. A magnetic head slider according to claim 1, wherein the average linear thermal expansion coefficient of said sintered body is selected in a range from $6 \times 10^{-6}$/° C. to $9 \times 10^{-6}$/° C.

4. A magnetic head slider according to claim 1, wherein said sintered body is formed via one of spattering and plating.

5. A magnetic disk recording device having a continuous medium type magnetic disk having a carbon protective layer and a magnetic head slider, wherein said magnetic slider is formed of a sintered body essentially consisting of titanium oxide as the major component thereof and at least one material selected from the group consisting of Y, Yb, Nb, Mg, Er, Fe, Cr, Zr and Al in an amount of from 2 atm % to 50 atm % with respect to the titanium oxide, wherein the at least one material forms a composite oxide with the titanium oxide which suppress chemical reaction of the titanium oxide with the carbon during sliding contact of the magnetic head slider with the continuous medium type magnetic disk, thereby reducing wear between surfaces of the magnetic head slider and magnetic disk, and wherein said sintered body further contains a carbide, said carbide being contained in an amount up to 30 volume %, selected from the group consisting of SiC, TiC, ZrC, NbC, VC, BC, HfC, TaC and WC.

6. A magnetic disk recording device according to claim 5, wherein the sintering temperature of said body is selected below 1400° C.

7. A magnetic disk recording device according to claim 5, wherein the average linear thermal expansion coefficient of said sintered body is selected in a range from $6 \times 10^{-6}$/° C. to $9 \times 10^{-6}$/° C.

8. A magnetic disk recording device according to claim 5, wherein said sintered body is formed via one of spattering and plating.

* * * * *